United States Patent
Giraud et al.

(10) Patent No.: US 8,062,754 B2
(45) Date of Patent: Nov. 22, 2011

(54) METHOD FOR HYDROPHOBISING AND IMPROVING THE BEADING EFFECT OF CONSTRUCTION MATERIALS

(75) Inventors: Yves Giraud, Sainte Foy les Lyon (FR); Martial Deruelle, Millery (FR); Henri Chauffriat, Lyons (FR); Sandrine Millot, Saint Genis Laval (FR); Jair Maggioni, Paulinia (BR)

(73) Assignee: Bluestar Silicones France, Lyon Cedex (FR)

( * ) Notice: Subject to any disclaimer, the term of this patent is extended or adjusted under 35 U.S.C. 154(b) by 598 days.

(21) Appl. No.: 11/997,270

(22) PCT Filed: Jul. 5, 2006

(86) PCT No.: PCT/FR2006/001600
§ 371 (c)(1),
(2), (4) Date: Feb. 3, 2009

(87) PCT Pub. No.: WO2007/012716
PCT Pub. Date: Feb. 1, 2007

(65) Prior Publication Data
US 2009/0215939 A1  Aug. 27, 2009

(30) Foreign Application Priority Data
Jul. 29, 2005 (FR) ..................... 05 08110

(51) Int. Cl.
*B32B 9/04* (2006.01)

(52) U.S. Cl. .............. 428/447; 106/287.13; 106/287.16; 106/287.19; 428/429; 428/452; 428/688; 428/689; 428/702

(58) Field of Classification Search .................. None
See application file for complete search history.

(56) References Cited

U.S. PATENT DOCUMENTS

| | | | |
|---|---|---|---|
| 5,486,567 A * | 1/1996 | Arai et al. ................ | 524/863 |
| 7,687,150 B2 * | 3/2010 | Simendinger et al. ........ | 428/447 |
| 7,875,674 B2 * | 1/2011 | Kirkpatrick et al. .......... | 524/588 |
| 2007/0277326 A1 | 12/2007 | Deruelle et al. | |

FOREIGN PATENT DOCUMENTS

| | | |
|---|---|---|
| DE | 3834462 | 4/1990 |
| EP | 275378 | 7/1988 |
| FR | 2865223 | 7/2005 |
| WO | WO 00/44687 | 8/2000 |
| WO | 02083778 | 10/2002 |

OTHER PUBLICATIONS

Abstract for JP 2000-73010 (Mar. 2000).*
Abstract for JP 2001-40286 (Feb. 2001).*
Abstract for JP 2000-89519 (Mar. 2000).*
Abstract for JP 08-48911 (Feb. 1996).*
International Search Report, PCT/FR2006/001600, dated Nov. 23, 2006.

* cited by examiner

*Primary Examiner* — Marc Zimmer
(74) *Attorney, Agent, or Firm* — Baker Donelson Bearman Caldwell & Berkowitz, PC

(57) ABSTRACT

The invention relates to the use of waterproofing liquid silicon compositions for impregnating porous construction materials, for example mineral or (ligno)cellulose materials.

15 Claims, No Drawings

METHOD FOR HYDROPHOBISING AND IMPROVING THE BEADING EFFECT OF CONSTRUCTION MATERIALS

The field of the invention is that of the hydrophobizing of porous construction materials (in particular inorganic or [ligno]cellulose construction materials), which are thus sensitive to moisture. In general, the hydrophobizing is carried out on components of construction materials once assembled to form parts of buildings.

Hydrophobizing is a surface treatment intended to limit the penetration of water by application of a product which modifies the surface tension of the treated material. It is required of a hydrophobizing treatment that it:

reduces the uptake of water by capillary action (reduction of the water absorption coefficient >90%);

has little affect on the permeability to water vapor (variation in the permeability coefficient <20%); and does not change the appearance of the treated material (color, gloss, roughness).

Surface hydrophobizing agents are colorless products which make it possible to render impermeable the surface layer of the porous construction material without substantially modifying the appearance or the permeability to water vapor thereof. For example, when the porous construction material is concrete, it is desirable for the pores and capillaries of the concrete to be coated internally but not filled. There is no formation of film at the surface.

This hydrophobizing is intended in particular to protect the material as best as possible against the penetration of water generally originating from driving rain or penetration of water from the ground. It is well known to hydrophobize construction materials, either during their manufacture or after they have been put in, using hydrophobizing agents which, in the case of materials such as stone, plaster or brick, are most generally silicone-based compositions.

Hydrophobizing using the hydrophobizing agent dissolved or dispersed beforehand in a suitable aqueous or nonaqueous solvent or liquid can be effectively carried out at the surface, in which case the surface of the material is painted or sprayed using the hydrophobizing agent, or else can be carried out deep into the material and, in this case, the hydrophobizing agent is introduced into the body of the material, which is possible, for example, for bricks, wood, concrete, plaster or reconstructed stone.

In the case of natural stone or of materials in situ forming, for example, existing walls, a surface treatment can be carried out or the hydrophobizing agent can be injected into the body of the material by forcing under pressure using a pipe introduced into an injection hole appropriately made in the material; it is also possible to infiltrate the hydrophobizing agent or to cause it to penetrate by impregnation and diffusion by capillary action into the material.

Hydrophobizing liquid silicone compositions exist either in the form of solutions in organic solvents, such as white spirit or heptane, or in the form of aqueous emulsions, which have appeared more recently on the market. Conventionally, after impregnation, the organic solvent phase or the aqueous phase of these compositions evaporates and the silicone active material remains in the body and at the periphery of the porous construction material, so as to form a barrier against moisture.

In order for hydrophobizing using a liquid silicone composition to be successful, it is important:

for the rheology of the latter to make possible penetration into the porous construction material over a thickness ranging from several millimeters to several centimeters, for a reaction to occur between the porous construction material and the hydrophobizing active silicic material, and, preferably, for this active silicic material to crosslink in the porous construction material, it being possible for this crosslinking to be the reaction which will bring about the creation of bonds between the porous construction material and the hydrophobizing silicic material.

However, one of the difficulties encountered in the formulation of a hydrophobizing liquid composition is the search for a satisfactory beading effect. The beading effect is an important property for the application as it is noticed straightaway by the final user. It characterizes the visual appearance of the substrate once, for example, the latter has been wetted by rain. The less water remaining attached to the surface, the better the beading effect.

The hydrophobizing treatments in which an interest is being taken in the context of the invention are those carried out using liquid silicone compositions comprising polyorganosiloxane resins. The porous construction materials under consideration can, for example, be stone based on calcium carbonate and/or on silica and/or on aluminosilicates, concrete, mortar, plaster, baked clay (bricks, tiles, and the like), wood or other similar construction materials exhibiting a degree of porosity or a surface state which makes possible the use of a hydrophobizing agent.

The term "wood" is understood to mean wood used in particular in existing, old or recent, constructions, such as exterior and interior paneling, beams, half-timbering or frames. Wood is, as is known, a porous material which strongly absorbs water.

Thus, an objective of the present invention is to develop a liquid silicone composition which no longer exhibits the abovementioned disadvantages.

To achieve this objective, the Inventors have had the credit of demonstrating, entirely surprisingly and unexpectedly, that a hydrophobizing composition based on silicone resin and in carefully chosen contents of each of the constituents of a catalyst mixture comprising at least one metal alkoxide and a crosslinking agent preferably chosen from silicates makes it possible to obtain compositions exhibiting, in addition to advantageous hydrophobizing properties, a noteworthy beading effect.

In particular, the invention relates to the use of hydrophobizing liquid silicone compositions intended to impregnate porous construction materials, for example inorganic or (ligno)cellulose construction materials.

A process for hydrophobizing porous construction materials, preferably inorganic or (ligno)cellulose construction materials, using the abovesaid liquid silicone composition is also targeted by the invention.

These objectives, among others, are achieved by the present invention, a first subject matter of which is the use, for hydrophobizing and improving the beading effect of a porous construction material, of a liquid silicone composition composed essentially of:

a) at least one polyorganosiloxane resin A exhibiting, per molecule, on the one hand, at least two different siloxyl units chosen from those of M, D, T and Q type, one of the units being a T unit or a Q unit, and, on the other hand, at least three hydrolyzable/condensable groups of OH and/or $OR^1$ type where $R^1$ is a linear or branched $C_1$ to $C_6$ alkyl radical;

b) at least one metal alkoxide B where the metal M can optionally be partially connected to one or more ligands, in a content $\geq 5\%$ by weight, preferably $\geq 6\%$ by weight and more preferably still ≧7% by weight, with respect to the polyorganosiloxane resin A, said metal alkoxide having the general formula:

$$M[(OCH_2CH_2)_a-OR^z]_n \quad (I)$$

in which:
M is a metal chosen from the group formed by: Ti, Zr, Ge, Mn and Al;
n=valency of M;
the $R^z$ substituents, which are identical or different, each represent a linear or branched $C_1$ to $C_{12}$ alkyl radical;
a represents zero, 1 or 2;
with the conditions according to which, when the symbol a represents zero, the $R^2$ alkyl radical has from 2 to 12 carbon atoms and, when the symbol a represents 1 or 2, the $R^2$ alkyl radical has from 1 to 4 carbon atoms; and
c) at least one crosslinking agent C, in a content ≧4% by weight, preferably ≧5% by weight and more preferably still ≧6% by weight, with respect to the polyorganosiloxane resin A, said crosslinking agent C having the formula $$Si[(OCH_2CH_2)_a-OR]_4 \quad (II)$$

in which:
the R substituents, which are identical or different, each represent a linear or branched C, to $C_{12}$ alkyl radical, and
a represents zero, 1 or 2.

According to another embodiment, the composition according to the invention additionally comprises an organic solvent which can be used for the hydrophobizing of construction materials. Mention may be made, as examples of solvent, without implied limitation, of organic solvents, such as white spirit or heptane.

The constituents A which can be used, separately or as a mixture, are conventional silicone resins, among which may be mentioned organosilicic resins prepared by cohydrolysis and cocondensation of chlorosilanes chosen from the group consisting of those of formulae $(R^3)_3SiCl$, $(R^3)_2Si(Cl)_2$, $R^3Si(Cl)_3$ and $Si(Cl)_4$. These resins are well known branched organopolysiloxane oligomers or polymers which are commercially available. They exhibit, in their structure, at least two different siloxyl units chosen from those of formulae $(R^3)_3SiO_{0.5}$ (M unit), $(R^3)_2SiO$ (D unit), $R^3SiO_{1.5}$ (T unit) and $SiO_2$ (Q unit), at least one of these units being a T or Q unit. The $R^3$ radicals are distributed in such a way that the resins comprise approximately 0.8 to 1.8 $R^3$ radicals per silicon atom. Furthermore, these resins are not completely condensed and they still have approximately 0.001 to 1.5 OH and/or $OR^1$ alkoxyl groups per silicon atom.

The $R^3$ radicals are identical or different and are chosen from linear or branched $C_1$-$C_6$ alkyl radicals, $C_2$-$C_4$ alkenyl radicals, phenyl or 3,3,3-trifluoropropyl. Mention may be made, for example, as $R^3$ alkyl radicals, of the methyl, ethyl, isopropyl, tert-butyl and n-hexyl radicals.

Mention may be made, as examples of branched organopolysiloxane oligomers or polymers, of MQ resins, MDQ resins, TD resins and MDT resins, it being possible for the OH and/or $OR^1$ groups to be carried by the M, D and/or T units, the content by weight of OH and/or $OR^1$ groups being between 0.2 and 10% by weight.

As regards the constituents B, mention may be made, as examples of $R^2$ symbols in the organic derivatives of the metal M of formula (I), of the radicals: methyl, ethyl, propyl, isopropyl, butyl, isobutyl, hexyl, 2-ethylhexyl, octyl, decyl and dodecyl.

Mention may be made, as concrete examples of constituents B which are preferred, of: alkyl titanates, such as ethyl titanate, propyl titanate, isopropyl titanate, butyl titanate, 2-ethylhexyl titanate, octyl titanate, decyl titanate, dodecyl titanate, β-methoxyethyl titanate, β-ethoxyethyl titanate, β-propoxyethyl titanate or the titanate of formula $Ti[(OCH_2CH_2)_2-OCH_3]_4$; alkyl zirconates, such as propyl zirconate or butyl zirconate; and mixtures of these products. They can also consist of a metal alkoxide where the metal M can be partially connected to one or more ligands, such as, for example, those derived in particular from β-diketones, β-ketoesters and malonic esters (such as, for example, acetylacetone) or from triethanolamine.

Mention may be made, as concrete examples of constituents C which are preferred, of: alkyl silicates, such as methyl silicate, ethyl silicate, isopropyl silicate or n-propyl silicate.

According to a preferred embodiment, the crosslinking agent C is a silicate of formula $Si(OR)_4$ in which the R substituents, which are identical or different, each represent a linear or branched $C_1$ to $C_{12}$ alkyl radical.

According to another preferred embodiment, the metal alkoxide B is a titanate of formula $Ti(OR')_4$ in which the R' substituents, which are identical or different, each represent a linear or branched $C_1$ to $C_{12}$ alkyl radical.

According to a particularly advantageous form, the crosslinking agent is a silicate of formula $Si(OR)_4$ in which the R substituents, which are identical or different, each represent a linear or branched $C_1$ to $C_{12}$ alkyl radical and the metal alkoxide is a titanate of formula $Ti(OR')_4$ in which the R' substituents, which are identical or different, each represent a linear or branched $C_1$ to $C_{12}$ alkyl radical.

This judicious choice makes it possible to optimize the hydrophobizing performance while obtaining a noteworthy beading effect.

The invention also relates to a process for hydrophobizing and for improving the beading effect of porous construction materials in which a composition according to the invention as defined above is applied to the material in question.

Mention may be made, as examples of porous materials, of the following substrates: stone, concrete, plaster, mortar, brick, tile and wood.

Other advantages and characteristics of the present invention will become apparent on reading the following examples, given by way of illustration and without any limitation.

EXAMPLES

Various formulations are prepared with the following constituents:
hydroxylated MDT silicone resin having 0.5% of OH by weight and composed of 62% by weight of $CH_3SiO_{3/2}$ units, 24% by weight of $(CH_3)_2SiO_{2/2}$ units and 14% by weight of $(CH_3)_3SiO_{1/2}$ units: 100 parts by weight;
mixture of:
n-butyl (Bu) titanate of formula $Ti(OBu)_4$: v parts by weight with respect to the silicone resin; and of
ethyl (Et) silicate of formula $Si(OEt)_4$: z parts by weight with respect to the silicone resin.

The formulations are subsequently rediluted in solvent (white spirit) before application in order to obtain, at the end, solutions with concentrations of 5% by weight.

Treatments:
The stones (in this instance soapstones) are treated by dipping in the solutions for a time of 2 times 5 seconds.
The stones are left to dry for 15 days at ambient temperature under an atmosphere with a relative humidity of 50%.

Two types of measurement are carried out:

Measurements of hydrophobizing by uptake of water by capillary action: the samples treated are placed in contact with the water and are then weighed regularly. The decrease in water adsorption is determined by standardizing the water uptake of the samples with that of an untreated control.

Measurements of beading effect: the performance is measured by subjecting the treated sample to rain. The sample is placed at 45° from the vertical and the rain is obtained by spraying water through a pierced pipe place horizontally at 20 cm above the sample. The amount of water poured out is 250 ml. The sample is weighed before and after the test and the beading effect is obtained by difference in weight.

RESULTS

All the compositions give similar good results with regard to hydrophobizing (measurement of the water uptake by capillary action).

TABLE 1

Variation in the level of titanate (y) with constant level of silicate (z = 7% by weight, with respect to the weight of the silicone resin)

| | % Titanate (y) | Hydrophobizing = reduction in the water uptake by capillary action by 100% (the higher the %, the better the hydrophobizing) |
|---|---|---|
| Composition 1 Comparative | 3 | 90% |
| Composition 2 Invention | 5 | 90% |
| Composition 3 Invention | 7 | 92% |

TABLE 2

Variation in the level (z) of silicate with constant level of titanate (y = 8% by weight, with respect to the weight of the silicone resin)

| | % Silicate (z) | Hydrophobizing = reduction in the water uptake by capillary action by 100% (the higher the %, the better the hydrophobizing) |
|---|---|---|
| Composition 4 Comparative | 0 | 87% |
| Composition 5 Comparative | 2 | 90% |
| Composition 6 Invention | 6 | 90% |

In contrast, in terms of beading effect, the use of concentrations according to the invention of titanate and of silicate makes it possible to obtain a noteworthy beading effect.

TABLE 3

Variation in the level of titanate (y) with constant level of silicate (z = 7% by weight, with respect to the weight of the silicone resin)

| | % Titanate (y) | Beading effect: Amount of water retained (the lower the value, the better the beading effect) |
|---|---|---|
| Composition 1 Comparative | 3 | 0.55 |
| Composition 2 Invention | 5 | 0.3 |
| Composition 3 Invention | 7 | 0.1 |

TABLE 4

Variation in the level (z) of silicate with constant level of titanate (y = 8% by weight, with respect to the weight of the silicone resin)

| | % Silicate (z) | Beading effect: Amount of water retained (the lower the value, the better the beading effect) |
|---|---|---|
| Composition 4 Comparative | 0 | 1 |
| Composition 5 Comparative | 2 | 0.5 |
| Composition 6 Invention | 6 | 0.1 |

What is claimed is:

1. A process for hydrophobizing and improving the beading effect of a porous construction material comprising applying a liquid silicone composition to a porous construction material, such that the liquid silicone composition is introduced into the porous construction material, wherein the liquid silicone composition consists of:
   a) at least one polyorganosiloxane resin A exhibiting, per molecule, on the one hand, at least two different siloxyl units chosen from those of M, D, T and Q type, one of the units being a T unit or a Q unit, and, on the other hand, at least three hydrolyzable/condensable groups of OH and/or $OR^1$ type where $R^1$ is a linear or branched $C_1$ to $C_6$ alkyl radical;
   b) at least one metal alkoxide B in a content $\geqq 5\%$ by weight with respect to the polyorganosiloxane resin A, said metal alkoxide having the general formula:

$$M[(OCH_2CH_2)_a-OR^2]_n \qquad (I)$$

in which:
   M is a metal chosen from the group formed by:
   Ti, Zr, Ge, Mn and Al;
   n=valency of M;
   the $R^2$ substituents, which are identical or different, each represent a linear or branched $C_1$ to $C_{12}$ alkyl radical;
   a represents zero, 1 or 2;
   with the conditions according to which, when the symbol a represents zero, the $R^2$ alkyl radical has from 2 to 12 carbon atoms and, when the symbol a represents 1 or 2, the $R^2$ alkyl radical has from 1 to 4 carbon atoms;

c) at least one crosslinking agent C, in a content ≧4% by weight with respect to the polyorganosiloxane resin A, said crosslinking agent C having the formula $$Si[(OCH_2CH_2)_a\text{—}OR]_4 \qquad (II)$$

in which:
the R substituents, which are identical or different, each represent a linear or branched $C_1$ to $C_{12}$ alkyl radical, and
a represents zero, 1 or 2; and d) an organic solvent which can be used for the hydrophobizing of construction material.

2. The process according to claim 1, wherein the crosslinking agent is a silicate of formula $Si(OR)_4$ in which the R substituents, which are identical or different, each represent a linear or branched $C_1$ to $C_{12}$ alkyl radical.

3. The process according to claim 1, wherein the metal alkoxide is a titanate of formula $Ti(OR')_4$ in which the R' substituents, which are identical or different, each represent a linear or branched $C_2$ to $C_{12}$ alkyl radical.

4. The process according to claim 1 wherein:
the metal alkoxide B is a titanate of formula $Ti(OR')_4$ in which the R' substituents, which are identical or different, each represent a linear or branched $C_2$ to $C_{12}$ alkyl radical, and
the crosslinking agent is a silicate of formula $Si(OR)_4$ in which the R substituents, which are identical or different, each represent a linear or branched $C_1$ to $C_{12}$ alkyl radical.

5. The process according to claim 1, wherein the porous construction material is stone, concrete, mortar, brick, tile or wood.

6. The process according to claim 1, wherein the silicone composition penetrates into the porous construction material and a reaction occurs between the porous construction material and the silicone composition.

7. The process according to claim 1, wherein the silicone composition crosslinks in the porous construction material and brings about the creation of bonds between the porous construction material and the silicone composition.

8. The process according to claim 1, wherein the metal alkoxide B is an alkyl titanate, alkyl zirconate, or mixtures thereof.

9. The process according to claim 1, wherein the metal alkoxide B is ethyl titanate, propyl titanate, isopyopyl titanate, butyl titanate, 2-ethylhexyl titanate, octyl titanate, decyl titanate, dodecyl titanate, β-methoxyethyl titanate, β-ethoxyethyl titanate, β-propoxyethyl titanate, the titanate of formula $Ti[(OCH_2CH_2)_2\text{—}OCH_3]_4$, propyl zirconate, butyl zirconate, or mixtures of these products.

10. The process according to claim 1, wherein the crosslinking agent C is methyl silicate, ethyl silicate, isopropyl silicate, or n-propyl silicate.

11. A process according to claim 1, wherein in part a), M is $(R^3)_3SiO_{0.5}$, D is $(R^3)_2SiO_{0.5}$, T is $R^3SiO_{1.5}$, and Q is $SiO_2$, and the $R^3$ substituents, which are identical or different, each represent a linear or branched $C_1$-$C_6$ alkyl radical, $C_2$-$C_4$ alkenyl radical, phenyl or 3,3,3-trifluoropropyl.

12. A process according to claim 11, wherein the $R^3$ substituent is methyl, ethyl, isopropyl, tert-butyl, or n-hexyl.

13. A process for hydrophobizing and improving the beading effect of a porous construction material comprising applying a liquid silicone composition to a porous construction material, such that the liquid silicone composition is introduced into the porous construction material, wherein the liquid silicone composition consists essentially of:

a) at least one polyorganosiloxane resin A exhibiting, per molecule, on the one hand, at least two different siloxyl units chosen from those of M, D, T and Q type, one of the units being a T unit or a Q unit, and, on the other hand, at least three hydrolyzable/condensable groups of OH and/or $OR^1$ type where $R^1$ is a linear or branched $C_1$ to $C_6$ alkyl radical;

b) at least one metal alkoxide B in a content ≧5% by weight with respect to the polyorganosiloxane resin A, said metal alkoxide having the general formula:

$$L\text{-}M[(OCH_2CH_2)_a\text{—}OR^2]_n \qquad (Ia)$$

in which:
M is a metal chosen from the group formed by:
Ti, Zr, Ge, Mn and Al, where said metal M is also partially connected to one or more ligands (L);
n=valency of M;
the $R^2$ substituents, which are identical or different, each represent a linear or branched $C_1$ to $C_{12}$ alkyl radical;
a represents zero, 1 or 2;
with the conditions according to which, when the symbol a represents zero, the $R^2$ alkyl radical has from 2 to 12 carbon atoms and, when the symbol a represents 1 or 2, the $R^2$ alkyl radical has from 1 to 4 carbon atoms; and c) at least one crosslinking agent C, in a content ≧4% by weight with respect to the polyorganosiloxane resin A, said crosslinking agent C having the formula $$Si[(OCH_2CH_2)_a\text{—}OR]_4 \qquad (II)$$

in which:
the R substituents, which are identical or different, each represent a linear or branched $C_1$ to $C_{12}$ alkyl radical, and
a represents zero, 1 or 2.

14. The process according to claim 13, wherein the ligands are β-diketones, β-ketoesters, malonic esters, or triethanolamine.

15. A liquid silicone composition consisting of:
a) at least one polyorganosiloxane resin A exhibiting, per molecule, on the one hand, at least two different siloxyl units chosen from those of M, D, T and Q type, one of the units being a T unit or a Q unit, and, on the other hand, at least three hydrolyzable/condensable groups of OH and/or $OR^1$ type where $R^1$ is a linear or branched $C_1$ to $C_6$ alkyl radical;

b) at least one metal alkoxide B in a content ≧5% by weight with respect to the polyorganosiloxane resin A, said metal alkoxide having the general formula:

$$M[(OCH_2CH_2)_a\text{—}OR^2]_n \qquad (I)$$

in which:
M is a metal chosen from the group formed by:
Ti, Zr, Ge, Mn and Al;
n=valency of M;
the $R^2$ substituents, which are identical or different, each represent a linear or branched $C_1$ to $C_{12}$ alkyl radical;

a represents zero, 1 or 2;
with the conditions according to which, when the symbol a represents zero, the $R^2$ alkyl radical has from 2 to 12 carbon atoms and, when the symbol a represents 1 or 2, the $R^2$ alkyl radical has from 1 to 4 carbon atoms; and c) at least one crosslinking agent C, in a content $\geq 5\%$ by weight with respect to the polyorganosiloxane resin A, said crosslinking agent C having the formula $$Si[(OCH_2CH_2)_a\text{—}OR]_4 \qquad (II)$$

in which:
the R substituents, which are identical or different, each represent a linear or branched $C_1$ to $C_{12}$ alkyl radical, and
a represents zero, 1 or 2; and d) an organic solvent which can be used for the hydrophobizing of construction material.

* * * * *